United States Patent
Kokubo (10) Patent No.: US 7,175,241 B2
(45) Date of Patent: Feb. 13, 2007

(54) BRAKE APPARATUS

(75) Inventor: Koichi Kokubo, Kariya (JP)

(73) Assignee: Advics Co., Ltd., Aichi-pref. (JP)

( * ) Notice: Subject to any disclaimer, the term of this patent is extended or adjusted under 35 U.S.C. 154(b) by 0 days.

(21) Appl. No.: 10/936,484

(22) Filed: Sep. 9, 2004

(65) Prior Publication Data
US 2005/0067893 A1   Mar. 31, 2005

(30) Foreign Application Priority Data
Sep. 26, 2003   (JP)   ............... 2003-335611

(51) Int. Cl.
*B60T 8/88*   (2006.01)
(52) U.S. Cl. ............... 303/122.12; 303/122.05; 303/15
(58) Field of Classification Search ............ 303/3, 303/15, 122.04, 122.05, 122.12, 20
See application file for complete search history.

(56) References Cited

U.S. PATENT DOCUMENTS

| | | | |
|---|---|---|---|
| 5,290,095 A * | 3/1994 | Wood et al. | 303/133 |
| 5,957,549 A * | 9/1999 | Nagai et al. | 303/122.12 |
| 6,109,879 A | 8/2000 | Yamada et al. | |
| 6,499,813 B1 * | 12/2002 | Wandel | 303/115.4 |
| 6,659,568 B2 * | 12/2003 | Wandel | 303/115.4 |
| 6,668,634 B1 * | 12/2003 | Zimmermann et al. | 73/129 |
| 6,719,377 B1 | 4/2004 | Zimmermann et al. | |

FOREIGN PATENT DOCUMENTS

| | | |
|---|---|---|
| DE | 197-36-752 A1 | 2/1999 |
| JP | 403096469 * | 4/1991 |
| JP | B-2513323 | 4/1996 |

OTHER PUBLICATIONS

English translation of JP 03096469.*
German communication issued from German Patent Office issued on Nov. 14, 2005 for the corresponding German patent application No. 10-2004-046-446.4-21 (English translation thereof).

* cited by examiner

*Primary Examiner*—Devon Kramer
(74) *Attorney, Agent, or Firm*—Posz Law Group, PLC (57) ABSTRACT

When a voltage supply to a motor is switched to OFF from ON, a brake fluid pressure control apparatus determines whether a duration of time required for a terminal voltage of the motor to reach a first threshold is shorter than a first predetermined duration of time, and whether a duration of time required for a terminal voltage of the motor to reach a second threshold lower than the first threshold is shorter than a second predetermined duration of time longer than the first predetermined duration of time. Then, when determinations are made that the terminal voltage of the motor reaches the first threshold in the duration of time shorter than the first predetermined duration of time, and that the terminal voltage of the motor reaches the second threshold in the duration of time shorter than the second predetermined duration of time, the voltage supply control portion determines that the motor seizes up and controls the voltage supply to the motor in the seizing-up state.

4 Claims, 5 Drawing Sheets

BRAKE APPARATUS

CROSS REFERENCE TO RELATED APPLICATION

This application is based upon and claims the benefit of Japanese Patent Application No. 2003-335611 filed on Sep. 26, 2003, the content of which are incorporated herein by reference.

FIELD OF THE INVENTION

This invention relates to a brake apparatus using a motor-driven pump for sucking up and discharging of brake fluid to perform various brake controls, such as anti-skid brake system control (hereinafter referred to as "ABS control"), traction control system control (hereinafter referred to as "TCS control"), brake assist control (hereinafter referred to as "BA control"), anti-sideslip control and the like.

BACKGROUND OF THE INVENTION

Conventionally, Japanese Patent No. 2513323 discloses a malfunction detecting apparatus detecting a seized-up state and/or a high-load application state of a motor used for the ABS control. More specifically, the seized-up state is the state in which the motor stops rotating because of the mechanical locking of the motor or a motor-driven pump.

Figure 5:
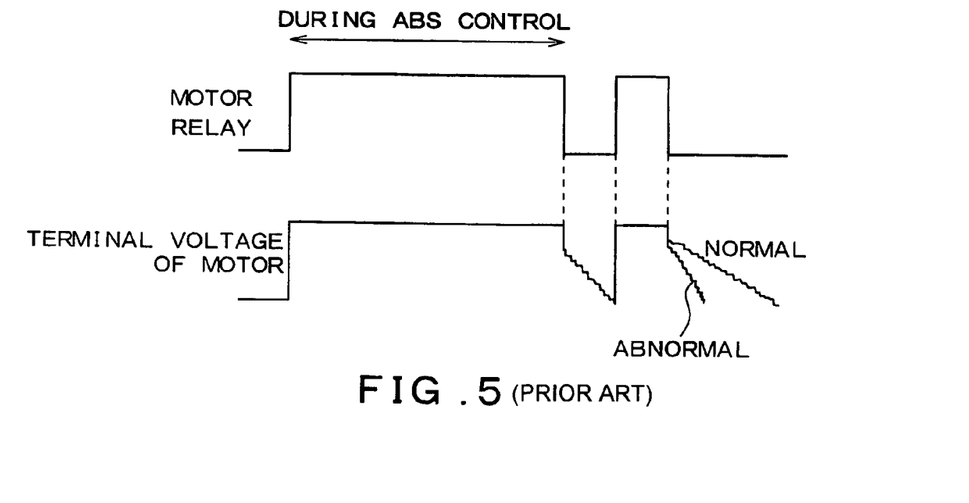
FIG. 5 is a timing chart of a seizing-state determination performed by a conventional malfunction detecting apparatus.

In this malfunction detecting apparatus, as shown in the timing chart in FIG. 5, the motor is driven during the ABS control to operate the pump for sucking up and discharging of the fluid contained in a reservoir. Then, at the time of the termination of ABS control, the malfunction detecting apparatus detects abnormal conditions caused by seizing-up of the motor or an application of a high load. More specifically, a terminal voltage of the motor measured when the motor relay is switched OFF. At the time of the switching of the motor relay from the ON state to the OFF state, a counter electromotive force is generated in accordance with a rotating state of the motor. Then, a falling gradient of this counter electromotive force is measured. When the measured falling gradient is sharp, the malfunction detecting apparatus determines the abnormal conditions as described above.

Figure 6:
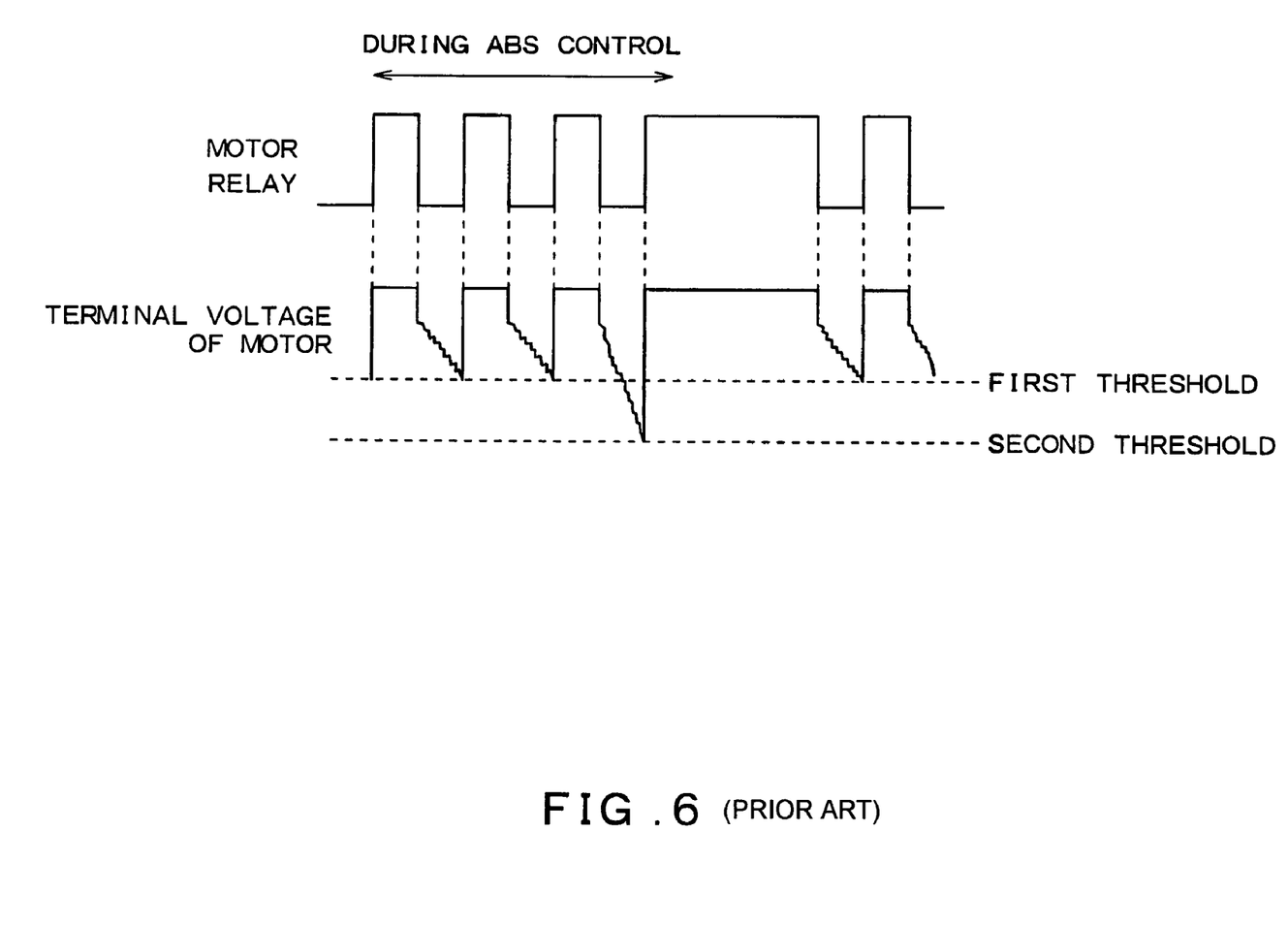
FIG. 6 is a timing chart of a conventional high-load detection.

Further, Published Japanese Translation of PCT Application JP-T-2002-506406 discloses the apparatus that repeatedly switches a motor relay ON and OFF in order to reduce noise produced by the passage of electric current through the motor for a long time. In this apparatus, as shown in the timing chart in FIG. 6, when a terminal voltage of the motor falls below a first threshold, a second threshold lower than the first threshold that is set for normal conditions is set in the motor speed control through which the motor relay is switched ON. When the apparatus determines that the terminal voltage of the motor falls below the second threshold, this determination denotes the detection of the application of a high load to the motor. Then, upon the detection of a high load, a motor-relay-ON duration is set to be longer than a duration of time before the high load application was detected. This setting renders the motor capable of rotating adequately even under a high load.

In the above Japanese Patent No. 2513323, an abnormal condition caused by seizing-up of the motor is detected. More specifically, when a counter-electromotive force in accordance with a rotating state of the motor has a sharp falling gradient, the apparatus detects an abnormal condition caused by seizing-up of the motor or a high load application. However, the seizing-up of the motor and the high load application are handled identically as an abnormal condition. Hence, it is impossible to detect the seizing-up of the motor and the high load application independently of each other. Further, the detection of an abnormal condition is made after the termination of the ABS control and, thus, it is impossible to detect an abnormal condition during the ABS control.

Further, also in the above Published Japanese Translation of PCT Application JP-T-2002-506406, after occurrence of the circumstances where the motor terminal voltage falls below the second threshold, the motor-relay-ON duration is made longer than that before the occurrence of such circumstances in all cases. After that, the motor-relay-ON duration is returned to that before it is extended. However, in either of these two abnormal conditions resulting from the seizing-up of the motor or the high load application, a terminal voltage of the motor comes to fall below the second threshold. Accordingly, it is impossible to detect the seizing-up of the motor and the high load application independently of each other.

Further, in the above Published Japanese Translation of PCT Application JP-T-2002-506406, as in the case of the application of a high load to the motor relay, when the motor has seized up, the motor-relay-ON duration is also extended temporarily, and then returned back.

At the time of the switching of the motor relay from the ON state to the OFF state, a high counter electromotive force is momentarily generated. Due to this high counter electromotive force, a semiconductor switch provided in the motor relay generates heat such as to damage the motor relay. Particularly, when the motor relay is repeatedly switched ON and OFF, a large counter electromotive force is generated every time the switching to ON from OFF is performed, which in turn increase heat generation. Finally, one more problem arising is the burnout of the motor relay.

SUMMARY OF THE INVENTION

It is an object of the present invention to provide detection of seizing-up of a motor and allow brake control in accordance with the detection result.

It is another object of the present invention to prevent a motor relay from being burned out by heat generation caused by seizing-up of a motor.

According to a first aspect of the present invention, a voltage supply control portion determines whether or not, when a voltage supply to a motor is switched to OFF from ON, a duration of time required for a terminal voltage of the motor to reach a first threshold is shorter than a first predetermined duration of time. Further, when a voltage supply to the motor is switched to OFF from ON, the voltage supply control portion determines whether or not a duration of time required for a terminal voltage of the motor to reach a second threshold which is lower than the first threshold is shorter than a second predetermined duration of time which is longer than the first predetermined duration of time. Then, when the voltage supply control portion determines that the terminal voltage of the motor reaches the first threshold in a duration of time shorter than the first predetermined duration of time, and that the terminal voltage of the motor reaches the second threshold in a duration of time shorter than the second predetermined duration of time, the voltage supply control portion determines that the motor has seized and controls the voltage supply to the motor in the seized state.

As described above, if the terminal voltage of the motor reaches the first threshold in the duration of time shorter than the first predetermined duration of time, a possible cause is occurrence of an application of high load to the motor or seizing-up of the motor. Further, if the terminal voltage of the motor reaches the second threshold in time shorter than the second predetermined duration of time, it can be said that the motor seizes up. Therefore, regarding such situation, it is possible to determine that the motor seizes up. Hence, it is possible to supply voltage to the motor to handle the seizing-up of the motor, and therefore to perform brake control in accordance with such voltage supply.

For example, when the voltage supply to the motor is switched to OFF from ON, upon a drop of the terminal voltage of the motor to reach the first threshold, the voltage supply control portion restarts the voltage supply to the motor. When the seizing-up of the motor is determined, it is possible to switch a motor relay OFF to stop the voltage supply to the motor. In this manner, it is possible to prevent the motor relay from undergoing burnout by heat generation resulting from the seizing-up of the motor.

Further, even if the seizing-up of the motor is determined, the voltage supply control portion is capable of continuing to pass electric power through solenoids provided in electromagnetic valves.

Further, the voltage supply control portion performs ON-OFF control on the motor relay during a predetermined control mode after a shift to the control mode, and controls voltage supply to restart the voltage supply to the motor upon a drop of the terminal voltage of the motor to reach the first threshold when the voltage supply to the motor is switched to OFF from ON. If a drive apparatus includes such a voltage supply control portion, it is possible to switch the motor relay ON at all times during the control mode by the voltage supply control portion when the seizing-up of the motor is determined. Accordingly, in this manner, it is also possible to prevent the motor relay from undergoing burnout by heat generation resulting from the seizing-up of the motor.

In this case, if the container chamber includes reservoirs that provide for reduction in the brake fluid pressure in the braking force generating units, when one of an anti-skid control mode and an anti-sideslip control mode is set as the control mode, the voltage supply control portion is also capable of switching the motor relay ON during the control mode, then leaving the motor relay ON during such a duration of time as required for the pumps to suck up the brake fluid from the reservoirs, and then re-determining whether or not the motor has seized up on the basis of a change in the terminal voltage of the motor occurring when the motor relay is switched OFF.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

The present invention will be described further with reference to various embodiments in the drawings.

First Embodiment

Figure 1:
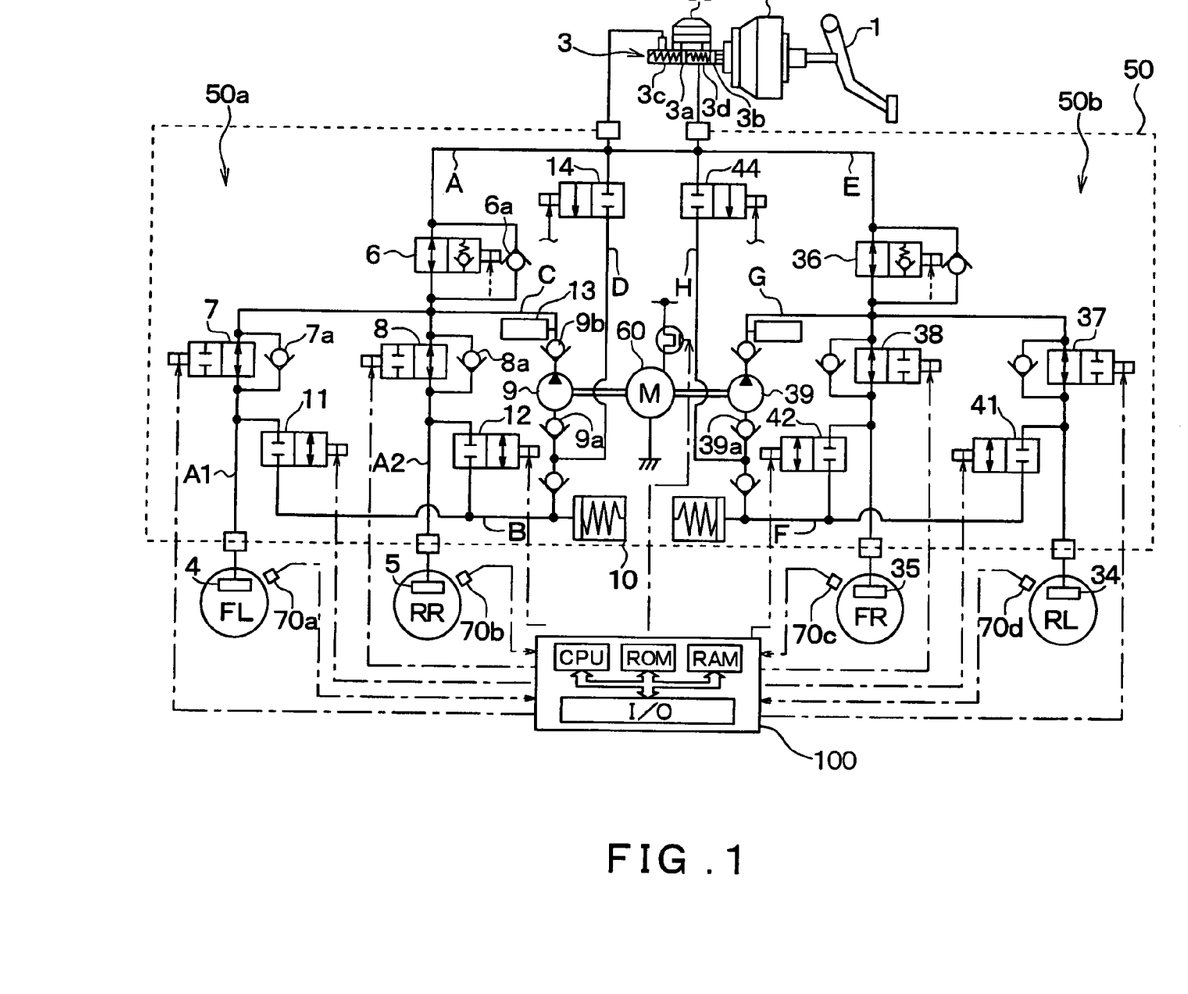
FIG. 1 is a diagram illustrating brake circuit of a brake apparatus in a first embodiment of the present invention.

Hereinafter, a first embodiment of the present invention will be described with reference to the drawings. FIG. 1 is a schematic diagram of the brake apparatus having a brake fluid pressure control apparatus. The schematic structure of the brake apparatus illustrated in the first embodiment is described with reference to FIG. 1.

In the first embodiment, the brake fluid pressure control apparatus according to the present invention is applicable to a vehicle provided with two brake circuits (diagonal lines): a first brake circuit for controlling brake fluid pressure applied to a front left wheel and a rear right wheel, and a second brake circuit for controlling brake fluid pressure applied to a front right wheel and a rear left wheel.

A brake pedal 1 in FIG. 1 serves as a brake operating member depressed by a vehicle-operator when braking force is applied to a vehicle. As illustrated in FIG. 1, the brake pedal 1 is connected to a booster 2 and to a master cylinder 3. When the vehicle-operator depresses the brake pedal 1, the depressed force is boosted by the booster 2. The booster 2 and the master cylinder 3 are serving as a brake fluid pressure source. The boosted force presses master pistons 3a, 3b provided in the master cylinder 3. Then, by means of this pressing, master-cylinder pressure (hereinafter referred to as "M/C pressure") is produced equally in a primary chamber 3c and a secondary chamber 3d defined by the master pistons 3a and 3b.

The master cylinder 3 is provided with a master reservoir 3e having paths communicating individually with the primary chamber 3a and the secondary chamber 3b. The master reservoir 3e supplies brake fluid to the master cylinder 3 through the paths, and stores surplus brake fluid in the master cylinder 3. Note that, each of the paths is formed with a diameter much smaller than that of each of main brake conduits extending from the primary chamber 3a and the secondary chamber 3b. Therefore, when the brake fluid flows toward the master cylinder 3 from the primary chamber 3a and the secondary chamber 3b of the master cylinder 3, orifice effects are exerted.

The M/C pressure produced in the master cylinder 3 is delivered through a brake control actuator 50 to each of wheel cylinders 4, 5, 34 and 35 serving as brake-force generating units. The brake control actuator 50 includes brake circuits having a first brake circuit 50a and a second brake circuit 50b. The M/C pressure is transmitted via the first and second brake circuits 50a and 50b to the wheel cylinders 4, 5, 34 and 35.

The brake control actuator 50 is structured as follows. The first and second brake circuits 50a and 50b are substantially identical in structure, and therefore only the first brake circuit 50a is described and the description of the second brake circuit 50b is omitted. The first brake circuit 50a includes a brake conduit A serving as a main brake conduit for transmitting the M/C pressure to each of the wheel brake-force generating unit, that is, the first wheel cylinder 4 provided on the front left wheel FL and the second wheel cylinder 5 provided on the rear right wheel RR. A wheel cylinder pressure (hereinafter referred to as "W/C pressure") is produced in each of the wheel cylinders 4 and 5 through the brake conduit A.

In the brake conduit A, a first differential pressure control valve 6 includes an electromagnetic valve which is capable of being controlled to switch between two positions for an open state and a differential pressure state. The first differential pressure control valve 6 is set at the valve position for the open state in normal brake conditions, and at the valve position for the differential pressure state when electric power is supplied to a solenoid coil. At the valve position of the first differential pressure control valve 6 for the differential pressure state, the first differential pressure control valve 6 permits flow of the brake fluid from the wheel cylinders 4 and 5 toward the master cylinder 3 only when the brake fluid pressure in the wheel cylinders 4 and 5 is increased by a predetermined value higher than the M/C pressure. Therefore, pressures in the wheel cylinders 4 and 5 are at all times kept from exceeding a pressure in the master cylinder 3 by a predetermined pressure in order to protect each of the brake conduits.

Then, the brake conduit A is divided into two brake conduits A1 and A2 at a position downstream from the differential pressure control valve 6 in the direction of the wheel cylinders 4 and 5. One of the two brake conduits A1 and A2 is provided with a first pressure increase control valve 7 for controlling a buildup of the brake fluid pressure delivered to the first wheel cylinder 4. The other is provided with a second pressure increase control valve 8 for controlling a buildup of the brake fluid pressure delivered to the second wheel cylinder 5.

Each of the first and second pressure increase control valves 7 and 8 includes an electromagnetic valve operating as a two-position valve which is capable of controlled for switching between an open position and a closed position. When the first and second pressure increase control valves 7 and 8 are switched to the open position, the valves 7 and 8 are able to apply to the first and second wheel cylinders 4 and 5 the M/C pressure or a brake fluid pressure produced by delivering brake fluid from a pump 9 which will be described later.

Note that, in the normal braking caused by the vehicle-operator pressing the brake pedal 1, the first differential pressure control valve 6 and the first and second pressure increase control valves 7 and 8 are switched to the open position at all times. Further, the first differential pressure control valve 6 and the first and second pressure increase control valve 7 and 8 are respectively provided in parallel with safety valves 6a, 7a and 8a. Because of the provision of the safety valve 6a to the first differential pressure control valve 6, when the driver presses the brake pedal 1 while the valve position of the first differential pressure control valve 6 is in the differential pressure state, the M/C pressure is able to be transmitted to the wheel cylinders 4 and 5. Further, because of the provision of the safety valves 7a and 8a to the respective pressure increase control valves 7 and 8, when the pressure increase control valves 7 and 8 are switched to the closed position, particularly, during the ABS control, if the driver releases the brake pedal 1, a reduction in the W/C pressure for both the front left wheel FL and the rear right wheel RR is possible in accordance with the releasing operation.

Further, a brake conduit B makes a connection between a reservoir port of the reservoir 10 and the brake conduit A located between the first and second pressure increase control valves 7 and 8 and the corresponding wheel cylinders 4 and 5. A first pressure decrease control valve 11 and a second pressure decrease control valve 12 and each includes an electromagnetic valve configured by electromagnetic valves are placed in the brake conduit B, and operates as a two-position valve which is capable of being controlled for switching between the open position and the closed position. The first and second pressure decrease control valves 11 and 12 are switched to the closed position at all times during normal braking.

A brake conduit C is placed to make connection between the reservoir 10 and the brake conduit A which is the main brake conduit. A self-priming pump 9 is provided on the brake conduit C. The pump 9 is driven by a motor 60 to suck up brake fluid from the reservoir 10 and discharge toward the master cylinder 3 or toward the wheel cylinders 4 and 5.

Figure 2:
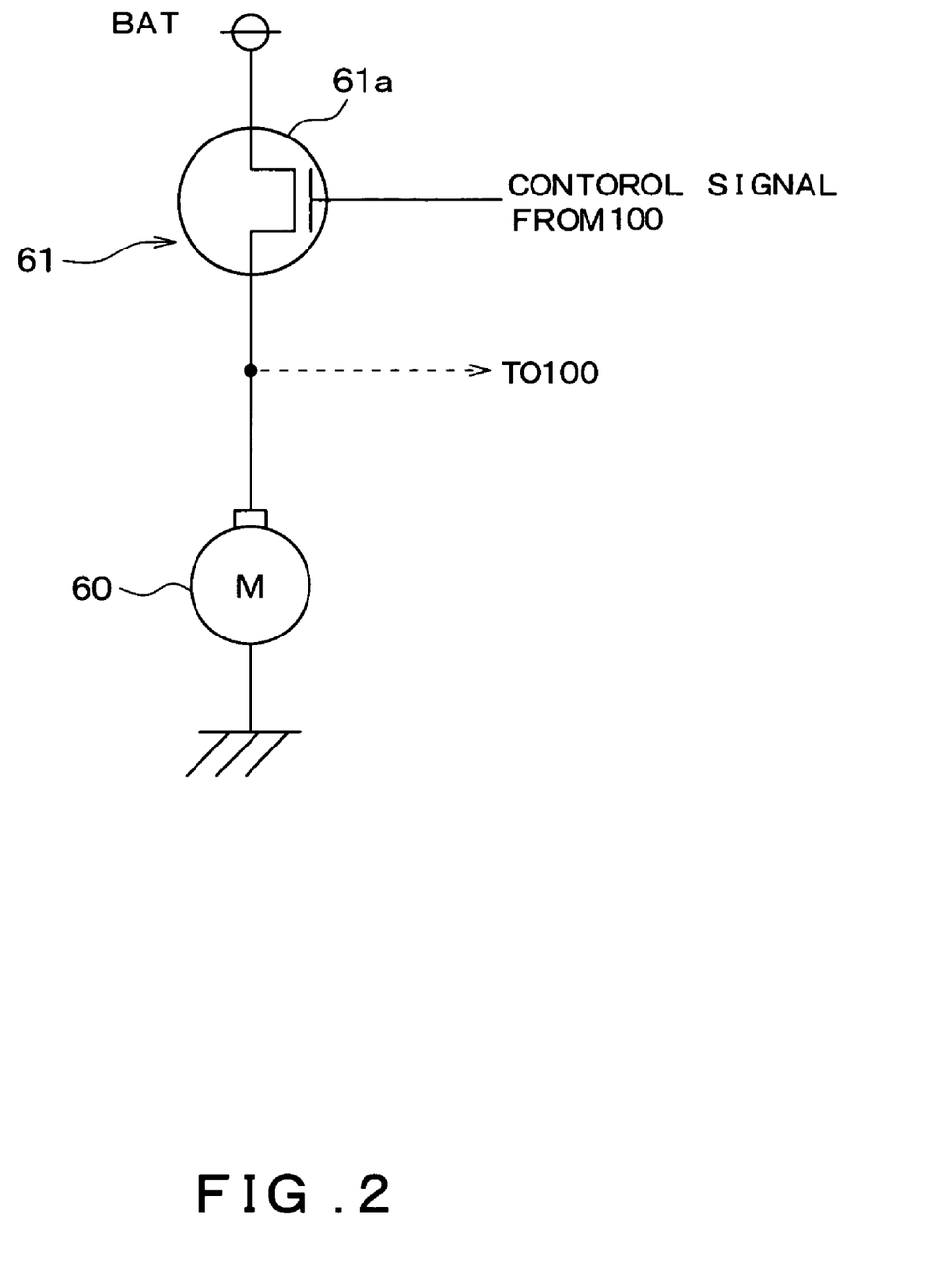
FIG. 2 is a diagram illustrating a circuit of a motor and a motor relay for driving the motor.

FIG. 2 is a diagram illustrating a circuit of a motor 60 and a motor relay 61 for driving the motor 60. As illustrated in FIG. 2, a battery voltage is applied to the motor 60. The semiconductor switch 61a provided in the motor relay 61 is switched ON/OFF to control a supply of voltage to the motor 60.

Note that the pump 9 includes safety valves 9a and 9b to enable sucking up and discharge in one direction. Further, a fixed capacity damper 13 is placed downstream from the discharge end of the pump 9 in the brake conduit C in order to ease the pulsation of the brake fluid supplied from the pump 9.

A brake conduit D is connected to the brake conduit C at a portion between the reservoir 10 and the pump 9. The brake conduit D is connected to the primary chamber 3c of the master cylinder 3. The brake conduit D includes a first control valve 14 which is capable of being controlled for switching between a closed position and an open position.

The brake fluid is sucked up from the master cylinder 3 through the brake conduit D by the pump 9, and then discharged to the brake conduit A. Accordingly, when performing the brake assist control, TCS control, ABS control, or anti-sideslip prevention control, the brake fluid is supplied to the wheel cylinders 4 and 5 to increase the W/C pressure of the corresponding wheels.

The second brake circuit has substantially the same structure as that in the first brake circuit. More specifically, the first differential pressure control valve 6 corresponds to a second differential pressure control valve 36. The first and second pressure increase control valves 7 and 8 respectively correspond to third and fourth pressure increase control valves 37 and 38, the first and second pressure decrease control valves 11 and 12 correspond to third and fourth pressure decrease control valves 41 and 42, the control valve 14 corresponds to the control valve 44, and the pump 9 corresponds to a pump 39. Further, brake conduits A, B, C and D respectively correspond to brake conduits E, F, G and H. The brake control actuator 50 is structured as described hitherto.

Further, the brake apparatus includes wheel speed sensors 70a to 70d respectively detecting rotational speeds of the wheels FL, FR, RL and RR. A detection signal from each of the wheel speed sensors 70a to 70d and a terminal voltage of the motor 60 are sent to a brake fluid pressure control apparatus 100 serving as a voltage supply control portion.

The brake fluid pressure control apparatus 100 includes a microcomputer that has CPU, ROM, RAM and an input/output portion (I/O) and performs control on brake fluid pressure in the brake apparatus. The brake fluid pressure control apparatus 100 generates a control signal for the motor relay 61 on the basis of the above detection signals in order to control voltage applied to the motor 60 for driving the two-position valves 6, 7, 8, 11, 12, 14, 36, 37, 38, 41, 42 and 44 and the pumps 9 and 39. Thus, a W/C pressure which will be produced at each of the wheel cylinders 4, 5, 34, and 35 is controlled.

Figure 3:
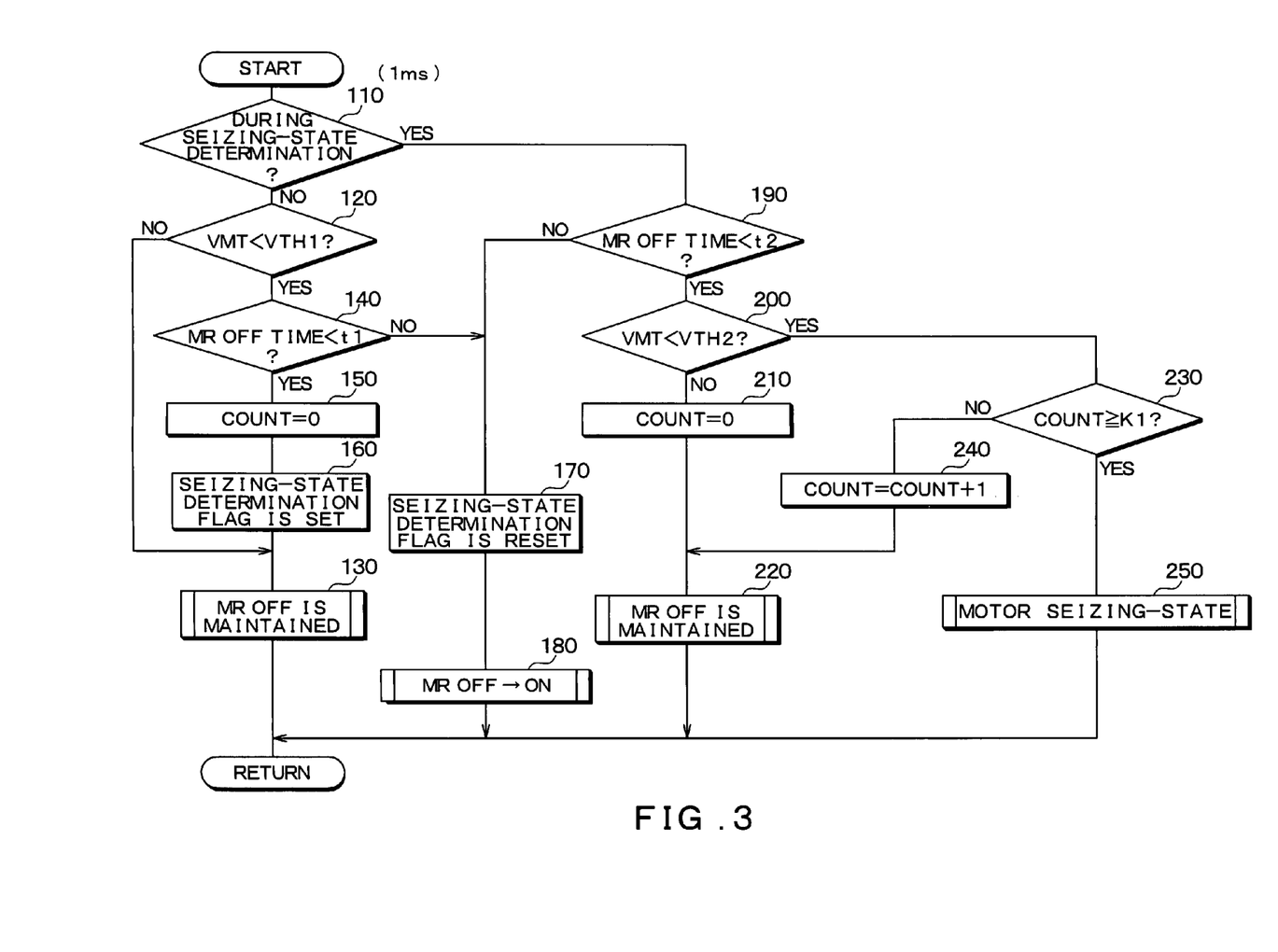
FIG. 3 is a flowchart showing a motor-relay drive processing routine performed by a brake fluid pressure control apparatus.
Figure 4:
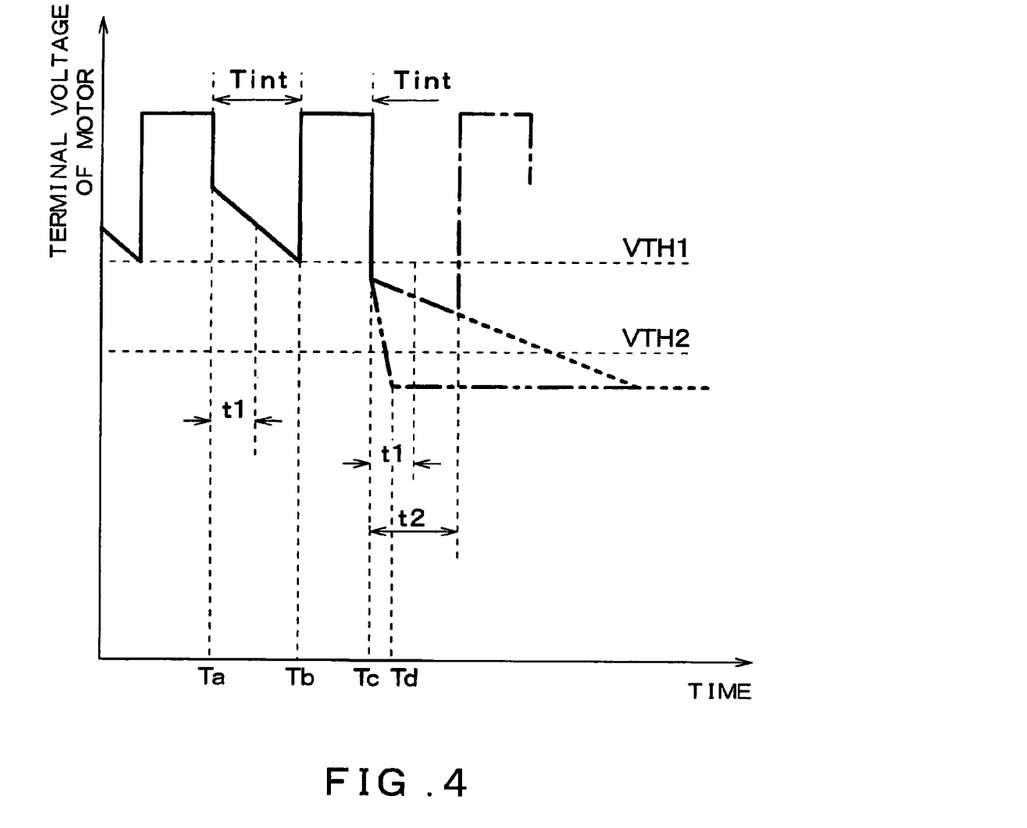
FIG. 4 is a timing chart of the motor-relay drive processing routine.

Next, the motor relay driving processing performed by the brake fluid pressure control apparatus 100 is described with reference to the flowchart in FIG. 3 and the timing chart in FIG. 4. The motor relay driving processing illustrated in the flowchart in FIG. 3 is performed during the interval from the time when the motor relay is switched OFF on the basis of a control signal from the brake fluid pressure control apparatus 100 until the time when the motor relay is switched ON (i.e. an interval Tint in FIG. 4) after the setting of any one control mode of the ABS control, TCS control, BA control and anti-sideslip control. That is, the processing starts at the same time as the output of a control signal from the brake fluid pressure control apparatus 100 for switching the motor relay 61 OFF. After being started, the processing is repeated in a control cycle of 1 ms, for example.

First, at 110, it is determined whether or not a seizing-state determination is being performed. A decision in this sub-routine depends on whether or not a seizing-state determination flag is set in the RAM of the brake fluid pressure control apparatus 100. The seizing-state determination flag described herein is set/reset at 160 or at 170, which will be described later.

Sequentially, the routine proceeds to the processing at 120, where it is determined whether or not a terminal voltage VMT of the motor 60 is lower than a first threshold VTH1. The first threshold VTH1 as defined here is a threshold determining a timing of switching of the motor relay from OFF to ON. Basically, when the terminal voltage of the motor 60 reaches the first threshold VTH1, the motor relay 61 is switched to ON from OFF.

If the negative determination is made at 120, it is determined that the terminal voltage of the motor 60 has not yet reached the first threshold VTH1, and the routine proceeds to the processing at 130. At 130, the output of the control signal for switching the motor relay 61 OFF is maintained, and this control routine is completed. Alternatively, if the affirmative determination is made at 120, it is determined that the terminal voltage of the motor 60 has reached the first threshold VTH1, and the routine proceeds to the processing at 140.

At 140, it is determined whether or not the OFF time of the motor relay 61 is shorter than a first predetermined duration of time t1. More specifically, if the motor 60 rotates normally, a counter electromotive force is generated in accordance with rotational speed of the motor 60, which in turn means that a decrease in the terminal voltage of the motor 60 depends on a decrease in the rotational speed of the motor 60. Hence, the duration of time until the terminal voltage of the motor 60 reaches the first threshold VTH1 becomes longer than the first predetermined duration of time t1 (see time Ta to time Tb in FIG. 4).

In contrast, when a high load is applied to the motor 60, the motor 60 has a slow rotational speed from the start or more quickly decreases in rotational speed. When the motor 60 seizes up, a counter-electromotive force caused by the rotation of the motor 60 is approximately zero because the motor 60 does not rotate from the start. Therefore, the duration of time until the terminal voltage of the motor 60 reaches the first threshold VTH1 becomes shorter than the first predetermined duration of time t1 (see from time Tc onwards in FIG. 4), as shown by a one-dot dashed line in FIG. 4 when a high load is applied to the motor 60, and as shown by a two-dot dashed line in FIG. 4 when the motor 60 seizes up.

Hence, if the affirmative determination is made at 140, it is determined that the motor 60 may probably seize up, and the routine proceeds to the processing at 150, where a counter (not shown) provided in the brake fluid pressure control apparatus 100 is set at zero. Then, the routine proceeds to the processing at 160, where the seizing-state determination flag in the RAM of the brake fluid pressure control apparatus 100 is set. Then, the routine proceeds to the processing at 130, where the output of the control signal for switching the motor relay 61 OFF is maintained, and this control cycle is terminated.

Alternatively, if the negative determination is made at 140, it is determined that the motor 60 may not probably seize up, and the routine proceeds to the processing at 170, where the seizing-state determination flag is reset. Then, the routine proceeds to the processing at 180. At 180, a control signal is supplied for switching the motor relay 61 ON, and this control cycle is terminated.

On the other hand, if the affirmative determination is made at 110 by setting the seizing-state determination flag at 160, the routine proceeds to the processing at 190.

At 190, it is determined whether or not the OFF time of the motor relay 61, that is, the duration of time starting from when the motor relay 61 is switched to OFF from ON, is shorter than a second predetermined duration of time t2. More specifically, as described above, when a high load is applied to the motor 60 or when the motor 60 seizes up, the duration of time until the terminal voltage of the motor 60 reaches the first threshold VTH1 becomes shorter than the first predetermined duration of time t1. However, when the motor 60 seizes up, the terminal voltage of the motor 60 quickly drops further after dropping lower than the first threshold VTH1, whereas when a high load is applied to the motor 60, the terminal voltage does not quickly drop after dropping lower than the first threshold VTH1.

Accordingly, the second threshold VTH2 is set lower than the first threshold VTH1. After the motor relay 61 is switched to OFF from ON, a duration of time until the terminal voltage of the motor 60 drops lower than the second threshold VTH2 is evaluated. If the evaluated duration of time is shorter than the second predetermined duration of time t2, which is longer than the first predetermined duration of time t1, the determination can be made that the motor 60 has seized up. If the evaluated duration of time is longer, the determination can be made that a high load has been applied to the motor 60.

Hence, at 190, it is determined whether or not the OFF time of the motor relay 61 is shorter than the second predetermined duration of time t2. If the OFF time of the motor relay 61 is equal to or longer than the second predetermined duration of time t2, it is determined that the motor 60 has not seized up but a high load has been applied to the motor 60. Then, the routine proceeds to the processing at 170 and 180, where the same sub-routines as described hitherto are performed. Note that during a duration of time before the OFF time of the motor relay 61 reaches the second predetermined duration of time t2, it is determined whether or not the motor 60 has seized up, so that the sub-routines from 200 and afterwards are performed.

At 200, it is determined whether or not the terminal voltage of the motor 60 is lower than the second threshold VTH2. If the negative determination is made, it is impossible to determine whether the motor 60 has seized up or a high load has been applied to the motor 60. Hence, the routine proceeds to the processing at 210, where the counter is set at zero, then the procedure moves to 220, where the output of the control signal for switching the motor relay 61 OFF is maintained, and this control cycle is terminated.

On the other hand, if the affirmative determination is made at 200, there is a high possibility that the motor 60 may seize up, but there also is a possibility that the determination may be false. Therefore, at 230, it is determined whether or not a value on the counter is a predetermined value K1, e.g. 1 or more 1. The predetermined value K1 as defined here means the number of control cycles in which the affirmative determination is made at 200 and the possibility that the motor 60 seizes up is determined. Only after the number of control cycles reaches the predetermined value K1, the determination that the motor 60 has seized up is made. Accordingly, only when the routine proceeds to the processing at 230 for the first time, value of the counter becomes zero. Therefore, the routine proceeds to the processing at 240, where the value of the counter is incremented by 1. Then at 220, the same processing as described above is performed.

In this case, the processing at 110, 190 and 200 to 230 is performed again. At 230, it is determined whether or not the value of the counter is equal to or larger than the predetermine value K1. Then if the value of the counter reaches the predetermined value K1, the determination that the motor 60 has seized up is made.

In this way, upon the determination that the motor 60 has seized up, the routine proceeds to the processing at 250 to perform a sub-routine providing for the case when the motor 60 seizes up and brings about an abnormal condition. More specifically, a warning light (not shown) notifies that the motor 60 has seized up and brought about an abnormal condition, and also any of the following processes are performed.

(1) After the seizing-up of the motor 60 has been detected, output of a control signal for switching the motor relay 61 ON is stopped to allow the motor relay 61 to remain OFF throughout the remainder of the duration of the control mode such as of the ABS control or the like. In this manner, it is possible to eliminate occurrence of a situation in which the motor relay 61 is switched ON regardless of the motor 60 seizing up. Accordingly, it is possible to prevent occurrence of a situation in which a counter-electromotive force is generated when the motor relay 61 is switched to OFF from ON under circumstances where the motor 60 has seized up, and allows the semiconductor switch 61a to generate heat to cause a burnout of the motor relay 61.

Further, in this case, each of the electromagnetic valves may be continuously driven while the motor relay 61 is switched OFF. By such continued driving, it is possible to adjust the brake fluid pressure produced before locking of the motor 60. Further, in the ABS control or the anti-sideslip control, it is possible to perform such controls until the reservoirs 10 and 40 become full.

(2) Even when the seizing-up of the motor 60 is detected, there is no denying this detection may be false. Therefore, after the seizing-up of the motor 60 is detected, the motor relay 61 remains ON throughout the remainder of the duration of the control mode such as of the ABS control or the like. In this manner, if the detection of seizing-up of the motor 60 is false, then the motor 60 is continuously driven during the control mode. Accordingly, it is possible to perform each of the control modes.

Note that, as described earlier, when the motor relay 61 is repeatedly switched between ON and OFF, a high counter-electromotive force is generated every time the switching from ON to OFF is performed, so that the amount of heat generated by the semiconductor switch 61a is increased. Hence, if the switching of the motor relay 61 between ON and OFF is repeated, there is a risk of burning out the motor relay 61. However, if the motor relay 61 is continuously maintained in the ON state, this makes it possible to reduce the number of occurrences of the counter-electromotive force generation. Accordingly, by employing the above manner, it is also possible to prevent the burnout of the motor relay 61. However, in this case, the switching of the motor relay 61 between ON and OFF is not repeated, and therefore a prevention effect on noise generated by continuously applying voltage to the motor 60 may not possibly be provided.

Further, in the case where the motor relay 61 remains ON in this way, the motor relay 61 is switched ON during the control mode, and then is maintained in the ON state during such a duration of time as required for the pumps 9 and 39 to suck up the brake fluid from the reservoirs 10 and 40. After that, based on a change in the terminal voltage of the motor 60 occurring when the motor relay 61 is switched OFF, it is determined again whether or not the motor 60 has seized up. In this manner, in the event that the seizing-state determination of the motor 60 is false, it is possible to use the pumps 9 and 39 to pump the brake fluid from the reservoirs 10 and 40. Thereby, when the ABS control or the anti-sideslip control is re-performed, it is possible to start the control under conditions of the reservoirs 10 and 40 being empty.

Other Embodiments

Further, the first embodiment has described the case where the present invention applies to the operation in various control modes as well as the ABS control mode. But the present invention is especially effective in the case where the conditions of load applied to the motor 60 are changed to a low load or a high load by the amount of pressure reduction of the brake fluid pressure, such as in the mode of the ABS control. Further, regarding a multifunctional brake apparatus capable of performing a plurality of control modes including the ABS control mode, the present invention may be applied only when the ABS control is performed. However, when conditions of high load equal to or higher than a certain load continues without interruption, such as in the BA control, there is no need to use the present invention.

Note that the first embodiment has described the brake apparatus having inlets of the pumps 9 and 39 connected through the brake conduits D and H to the primary chamber 3c and the secondary chamber 3d of the master cylinder 3. This brake apparatus is described as a simply illustrative example. Accordingly, the present invention is applicable to any brake apparatus having another brake circuit, for example, to a brake apparatus in which the inlets of the pumps 9 and 39 are connected to the master reservoir 3e and brake fluid is pumped from the master reservoir 3e when the TCS control is performed.

While the above description is of the preferred embodiments of the present invention, it should be appreciated that the invention may be modified, altered, or varied without deviating from the scope and fair meaning of the following claims.

What is claimed is:
1. A brake apparatus, comprising;
   a container chamber that contains brake fluid;
   a pump for drawing and discharging the brake fluid contained in the container chamber;
   a motor for driving the pump;
   a voltage supply control portion for controlling a voltage supply to the motor;

a motor relay that is driven to alternately switch between ON and OFF states by the voltage supply control portion, wherein the motor relay serves as a switch for the supply of voltage to the motor; and brake-force generating units for generation of braking force on the basis of a brake fluid pressure adjusted on the basis of the brake fluid supplied from the pump, wherein the voltage supply to the motor is controlled by the voltage supply control portion to control driving of the pump, the voltage supply control portion determines whether or not, when the voltage supply to the motor is switched to OFF from ON, a period of time required for the terminal voltage of the motor to reach a first threshold is shorter than a first predetermined period of time, and the voltage supply control portion determines whether or not, when the voltage supply to the motor is switched to OFF from ON, a period of time required for a terminal voltage of the motor to reach a second threshold, which is lower than the first threshold, is shorter than a second predetermined period of time, the second predetermined period of time is longer than the first predetermined period of time, when the voltage supply control portion determines that the terminal voltage of the motor reaches the first threshold in a time period that is shorter than the first predetermined period of time, and that the terminal voltage of the motor reaches the second threshold in a time period that is shorter than the second predetermined period of time, the voltage supply control portion determines that the motor has seized and continues to control the voltage supply to the motor, the voltage supply control portion is provided for performing ON-OFF control of the motor relay during a predetermined control mode after a shift to the control mode, and upon a drop of the terminal voltage of the motor to reach the first threshold when the voltage supply to the motor is switched to OFF from ON, the voltage supply control portion restarts the voltage supply to the motor, and when seizure of the motor is determined, the voltage supply control portion switches the motor relay ON at all times during the control mode, and the voltage supply control portion repeatedly supplies voltage if it is determined that the period of time required for the terminal voltage of the motor to reach the first threshold is shorter than the first predetermined period of time and if the terminal voltage of the motor has reached the second threshold when the second predetermined period of time has passed.

2. The brake apparatus according to claim 1, wherein, upon a drop of the terminal voltage of the motor to reach the first threshold when the voltage supply to the motor is switched to OFF from ON, the voltage supply control portion restarts the voltage supply to the motor and, when seizure of the motor is determined, the voltage supply control portion switches the motor relay OFF to stop the voltage supply to the motor.

3. The brake apparatus according to claim 2, further comprising electromagnetic valves that include solenoids, respectively, and are driven by energizing of the solenoids by the voltage supply control portion for controlling a supply of the brake fluid to the braking force generating units, wherein the voltage supply control portion continues to energize the electromagnetic valves even when seizure of the motor is determined.

4. The brake apparatus according to claim 1,
wherein the container chamber includes reservoirs that provide for reduction in the brake fluid pressures in the braking force generating units,
wherein when one of an anti-skid control mode and an anti-sideslip control mode is set as the control mode, the voltage supply control portion switches the motor relay ON during the control mode, then leaves the motor relay ON during such a period of time as required for the pumps to pump the brake fluid from the reservoirs, and then re-determines whether or not the motor has seized on the basis of a change in the terminal voltage of the motor occurring when the motor relay is switched OFF.

* * * * *